Nov. 13, 1945.  R. T. KILLMAN  2,388,852
AUTOMATIC NOZZLE
Filed March 25, 1943
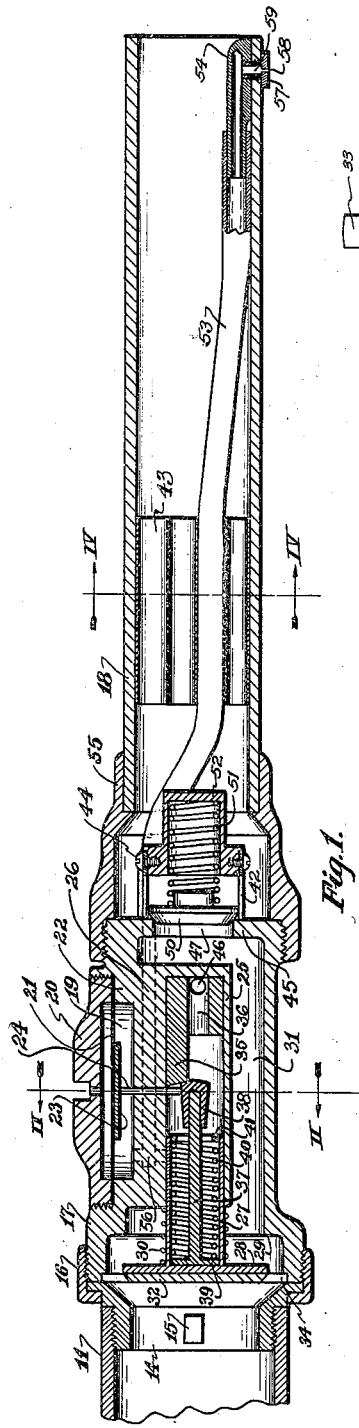
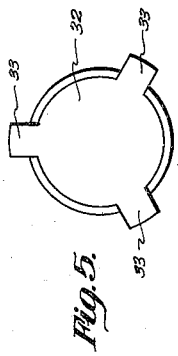
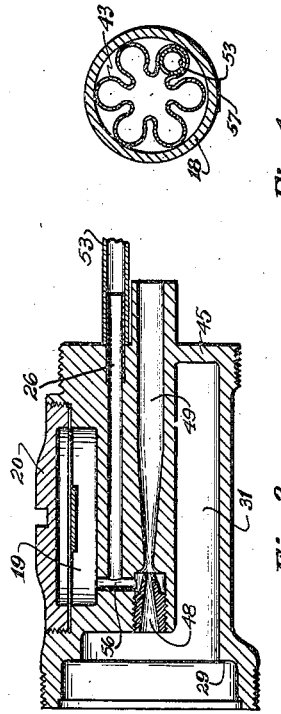
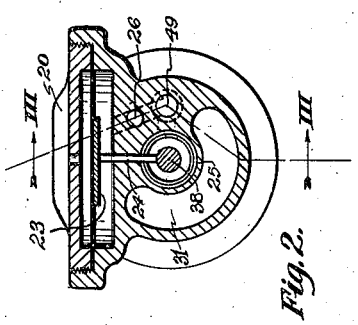
INVENTOR.
Robert T. Killman

UNITED STATES PATENT OFFICE 2,388,852

AUTOMATIC NOZZLE

Robert T. Killman, Nashville, Tenn.

Application March 25, 1943, Serial No. 480,435
In Canada March 16, 1943

4 Claims. (Cl. 226—127)

This invention relates in general to liquid dispensing nozzles or spouts such as, for example, gasoline dispensing nozzles, commonly used in automobile service stations attached to the end of a flexible hose line and supplied with gasoline from a meter pump, for dispensing gasoline and conveying it into automobile fuel tanks, and relates more specifically to a nozzle which will automatically cut off the flow of liquid when the tank or container becomes full or when the liquid therein rises to some pre-determined level.

In the operation of automobile service or filling stations, it is often difficult to ascertain when the fuel tank of an automobile being filled with gasoline may be shut off without running the tank over and causing a waste of gasoline, spattering of gasoline over the surfaces of the car adjacent the filler opening, and fire hazard. The liquid level indicating gauges usually installed upon the automobiles are often unreliable, and are generally located upon the dashboard of the automobile out of sight of the service station attendant who is filling the tank. Very often, due to gauge inaccuracies a customer will order a certain specified number of gallons of gasoline when in reality the tank cannot accommodate the addition of the specified amount, thus tending to cause the tank to be run over.

It is an object of the present invention to provide means whereby the flow of gasoline, or other fluid, into a tank or other container, will be automatically shut off before the tank is filled to overflowing, entirely independent of and without any attention from the operator.

The fundamental principle of operation is as follows: Fluid flows through a Venturi tube which has its suction opening connected to a chamber having a movable wall (such as a bellows, a diaphragm, a piston or the like). This chamber is connected by a tube to the position which the upper surface of the liquid in the container is desired to occupy at the moment the flow of liquid is desired to be cut off. Until the liquid surface reaches this predetermined level, this tube supplies the chamber with air in such quantities that the Venturi tube is unable to evacuate said chamber sufficiently to cause movement of said movable wall. When, however, the liquid reaches the predetermined level and covers the end of said tube, it cuts off the air supply to the chamber and due to the great preponderance of the viscosity of the liquid over that of the air, the liquid is unable to travel through the tube and through certain restricted portions thereof, in sufficient quantities to prevent the Venturi tube from evacuating the chamber sufficiently to cause a movement of said movable wall, which movement causes a closure of a valve, thus cutting off the flow of the liquid.

We are aware that a number of devices of this type have been previously made, but all of them which have come to our attention are subject to certain faults and disadvantages.

For example, most of the prior devices of this type caused the entire fluid flow to pass through the Venturi tube. Since the efficiency of Venturi tubes in producing a vacuum depends upon the amount and the speed of the fluid passing therethrough, and these tubes must in all cases, in order to operate at all, be supplied with fluid in sufficient quantities to entirely fill them it will be evident that if the flow of gasoline through a nozzle of this type is decreased beyond a certain minimum the device will become wholly inoperative. In order to accommodate the full flow of the gasoline the Venturi tube must be made comparatively large and therefore the minimum flow, above mentioned will be large. Therefore in all devices of this type the flow controlling valve is intended to be latched or held by the operator in its wide open or full flow position, in order that the Venturi tube may function properly.

Now it is well known to those experienced in the operation of gasoline filling stations that an increasing number of automobiles have fuel tanks and filler tubes and openings which will not receive gasoline at a high rate. This is due to the fact that the inlet tube which extends from the filling neck of the gasoline storage tank of some automobiles is now formed with baffles and with curved portions in order to prevent a siphon tube from being used so as to illegally remove gasoline from the tank. Also artistic considerations, streamlining, etc., in the designing of modern cars has necessitated the placing of the filler opening some distance from the fuel tank and connecting the two by means of a relatively long, tortuous, and often very small pipe. It may be mentioned here that this construction makes impractical the use of floats, etc., which must extend a considerable distance into the fluid in order to be operative.

Since, very rarely are fuel tanks vented to any extent, except through the filler opening, difficulty in filling such tanks at any great speed is frequently encountered, due to the entrapped air in the tank, preventing additional gasoline from entering and escaping through the filler tube carrying gasoline outward with it causing overflowing even though the fuel tank is not full of gasoline. In order to fill a tank of this type, the rate of flow of the gasoline must be greatly reduced, and the inability to operate at the necessary reduced flow is one of the faults of the prior devices of this character. Accordingly, it is an object of the present invention to provide an automatic shut-off nozzle which remains fully operative and efficient over the full range of flow from a few drops per minute to the full flow of gasoline as delivered by the meter pump, said range of flow conditions covering any and all rates of flow necessary to properly fill the most recalcitrant tank to be met in practical operation. It is contemplated in this invention that the rate of flow of gasoline be at all times under complete control of the operator, who may, by operating a single grip lever, start or stop the flow, or adjust it to any desired rate or volume at will without interfering with or being interfered with by the automatic action of the device.

Another fault inherent in most prior devices of this character with which I am familiar is due to the fact that they all make use of the restriction due to the small bore of the tube above mentioned (which connects the chamber with the location of the desired fluid level at which cut-off should occur) to distinguish between the difference in viscosity of fluid and air to cause the movable wall to cause the shut-off valve to operate. The fault lies in that if the device is once operated the small tube is left full or nearly full of fluid trapped therein either by capillary action or gravity etc. Upon attempting to use the device a second time, this entrapped fluid, due to its viscosity and the smallness of the bore of the tube, prevents air from reaching the chamber and causes an immediate movement of the movable wall and a shutting off of the fluid flow. This false operation takes place every time an attempt is made to pass fluid through the nozzle until the small tube is cleared of fluid.

Accordingly, an object of the present is to provide, in a device of this character, means whereby false operations of the device will be entirely eliminated and a prior operation of the device always leaves it in perfect operable condition for any subsequent operation, without any resetting, clearing of tubes or other attention on the part of the operator.

Another object of the present invention is to provide a device of this character which, due to the absence of floats, weights, etc., will operate in any and all positions in which it is possible to use it to fill a tank, and which, with the exception of automatically shutting off the flow of fluid when the tank becomes full to the predetermined level, is not different in operation in any way from the ordinary dispensing nozzles now in common use.

It is well known that nearly all liquids, gasoline included, when directed into a tank have a tendency to bubble or foam, and that this foam in some cases bubbles out of the filter tube when the tank becomes almost full. If this foam or bubbles is allowed to overflow, almost as much damage is done as if the fluid itself had overflowed. Accordingly it is an object of the present invention to provide in a device of this character means whereby the automatic operation is caused to take place by any foam or bubbles which may be on the liquid surface if such foam or bubbles tend to rise higher than the predetermined level. The operation of the device does not depend upon the inertia or momentum of any current of fluid, as do certain prior devices, and therefore, will automatically shut off the flow when the fluid level rises to such height that there is danger of foam or bubbles overflowing.

Another object of the present invention is to provide in a device of this character means whereby the operator is given a signal, which may be felt, seen and heard, that the automatic operation has taken place and cut off the flow of fluid.

Another object of this invention is to provide a nozzle having means associated therewith for automatically and entirely shutting off the flow of fluid therethrough without appreciably changing the dimensions from those of the conventional nozzle in common use today. Therefore, this improved nozzle may be used for delivering gasoline into tanks having filling necks of conventional construction, and may be hung upon any of the hooks or other supporting devices and may be locked in place thereon by any of the locking means in common use in connection with the dispensing pumps now on the market.

Another object of the present invention is to provide means whereby the entrainment of air in the stream of liquid emerging from the device into the container being filled is effectively prevented and the stream is caused to be of a well formed coherent nature which is adapted to enter the filler tubes of fuel tanks with a minimum amount of turbulence and disturbance.

Another object of the present invention is to provide a device of this type which does not have protruding or external levers, latches, triggers or the like, which may come into contact with some external objects such as the car body or accessories, the hands or other portions of the operator's body, etc., and thereby be prevented from operating properly or be caused to operate falsely thereby. The only projecting lever is the usual manual valve operating grip lever and this is in no way connected with the automatic mechanism.

Another object of the present invention is to provide a device of this character which may be manufactured as a complete nozzle, or certain portions of which may be used as an attachment or accessory to nozzles now in use.

A further object is to provide a device of this character which will be formed of a few strong simple and durable parts, which will be inexpensive to manufacture and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

It is to be understood, of course, that this nozzle or spout is not limited for any particular use. It may be used for filling any kind of tank or receptacle with a variety of different fluids. It is described in connection with automobile fuel tanks for the reason that they will be its most general use.

The method of accomplishing the above mentioned objects and advantages will be clearly understood by reference to the following description in connection with the accompanying drawing, in which Figure 1 is a vertical sectional view of the invention, taken through its longitudinal axis.

Figure 2 is a cross section of the device taken along the line II—II of Figure 1.

Figure 3 is a sectional view taken along the line III—III of Figure 2.

Figure 4 is a sectional view taken along the line IV—IV of Figure 1.

Figure 5 is a plan view of one of the parts of the device in order to more clearly show its form.

Referring now in more detail to the drawing the numeral 11 indicates generally the usual manually operated nozzle valve adapted to be attached to the delivery end of a flexible hose which in turn is attached to a liquid pump, usually a gasoline or other fuel dispensing combination pump and meter as used generally at gasoline filling stations. The nozzle valve 11 essentially comprises a casing, a valve contained therein and urged to its closed position by a suitable spring, a projecting valve stem and a hand lever, by which the operator may open the valve against the pressure of the liquid and of the spring. Such a nozzle valve usually incorporates some arrangement to prevent chatter and to allow smooth control of the stream. These arrangements usually take the form of multiple valves, dashpot controls, variable leverage, etc. A tubular spout is generally threaded into the delivery end of the nozzle valve for the delivery of liquid to the desired point. Such valves are well known in the art and vary in detail with the individual maker, and the details and construction thereof form no part of this invention.

The automatic shut-off device of this invention is an attachment designed to be threadedly attached to any nozzle valve as above described and forming with said nozzle valve a structure of approximately the same dimensions as the nozzle valve with its original tubular spout so that the nozzle valve with the automatic shut-off device attached may be hung up on the pump or other dispenser and used in every way exactly as was the nozzle valve with its original tubular spout.

Our automatic shut-off device includes an adaptor sleeve 14 externally threaded and adapted to threadedly engage the nozzle valve casing 11. Internally formed lugs 15 allow a suitable wrench to be used for tightening the sleeve 14 therein. A clamp ring 16 having an internal shoulder for co-acting with an externally formed shoulder on the adaptor sleeve 14 threadedly engages the externally threaded enlarged portion of the casing 17 and draws casing 17 against the adaptor sleeve 14 forming a liquid tight joint. This joint arrangement allows of the use of different styles and sizes of adaptor sleeves 14 to fit all nozzle valves now in use and also allows the automatic shut-off attachment to be attached to the nozzle valve in the proper relation thereto.

Threadedly attached to the other end of the casing 17 is the adaptor 55 to which is attached, by soldering, spinning or otherwise, the tubular spout member 18 which may be straight as shown or may be bent downward at a slight angle to allow convenient delivery of liquid. Formed integrally with the casing 17 is the circular diaphragm chamber 19 which is internally threaded to receive the diaphragm retainer and lid 20 which clamps a diaphragm 21 between the lower surface of its depending peripheral shoulder and a co-acting shoulder 22 formed within the diaphragm chamber 19. The diaphragm 21 is made of thin material such as impregnated fabric, thin corrugated metal or the like, and is provided with sufficient slack so as to be capable of appreciable vertical movement within the diaphragm chamber 19.

Depending from and integral with the lower surface of the diaphragm chamber is the cylinder 25 which is concentric with the casing 17. Slidably located in cylinder 25 is the piston member 27 which carries at its outer end the valve member 28 which co-acts with valve seat 29 formed in the interior surface of casing 17 to control the passage through casing 17.

The piston 27 is bored out for most of its length to receive the latch member 37 which has a flat disc base 39 which is yieldably held flat against the flat bottom of the bore of the piston by the compression spring 40 which is retained under compression in the bore by the ring 41. A contact member 38, which may be made of hardened steel to lessen wear, is carried on the free end of latch member 37. From the description of the piston and latch mechanism so far given, it will be seen that spring 40 tends to retain latch member 37 and contact member 38 concentric to piston 27 and if they are displaced in any direction from their central position to urge them to return thereto.

Valve spring 30 urges piston 27 and its attached valve disc 28 outward from cylinder 25 against the baffle plate 32 which is secured in a shallow recess 34 formed in the end of casing 17, by means of the three radial fingers 33. This plate acts as a stop to the opening of valve and also protects the valve from the closing force caused by the flow of liquid through the device.

Positioned at the inner end of cylinder 25 is the latch abutment 35 which normally co-acts with the latch contact member 38 to prevent valve 28 from closing against its seat 29. The contacting surfaces of member 35 and 38 are preferably formed as arcs of a circle whose center is the point on the edge of disc 39 upon which it rocks when the latch member is depressed, downward by means now to be described.

Located in the chamber 19 immediately under and parallel to the diaphragm 21 is the circular plate 23 in the center of the underside of which is attached the pusher rod 24 which extends downward through the lower wall of chamber 19 into cylinder 25 just in front of abutment 35. Thus it will be seen that a downward deflection of diaphragm 21 will be communicated by plate 23 and rod 24 to the latch contact member 38 so that member 38 will be forced down and out of contact with abutment 35 thus placing valve 28 in a closable condition.

The lower end of casing 17 is closed by a wall 45 through which extends the valve opening 47 normally closed by the valve 50 yieldably held against its seat by spring 51 and guided by the valve cage 42. Spring 51 is retained in position by the retaining member 52 attached to valve cage 42 by screws 44.

Located in the casing 17 to one side of cylinder 25 is the Venturi tube 49 which passes through the wall 45 to one side of valve opening 47. A jet member 48 directs a jet of liquid into the Venturi tube 49. The suction opening 56 of the venturi connects with chamber 19. Joining the opening 56 at a point between diaphragm chamber 19 and the venturi is the passage 26 which also passes through wall 45 and to which is attached the tube 53 which passes down inside of spout 18 to a point close to its discharge end and connects to member 54 which is secured to the lower side of spout 18 by means of the screw 57 which is drilled out as at 59 with a comparatively large opening for the major portion of its length and for the remaining portion of its length with a small orifice 58.

Located within spout 18 is the crimped tube member 43, the purpose of which is to straighten out the flow of liquid therethrough and prevent any tendency for the stream to rotate, thus causing the stream of liquid to be well formed as it emerges from spout 18 so it will cause a minimum amount of turbulence in the container being filled.

The operation of the device is as follows: Assume nozzle valve 11 to be connected by means of a suitable flexible hose to the ordinary gasoline dispensing pump supplying gasoline to it as the usual pressure. If now the operator grips the operating lever of the nozzle valve the valve will be opened and fluid will be allowed to pass through the nozzle valve and into the automatic shut-off attachment of my invention which is assumed to be attached to the nozzle valve 11 at the end thereof instead of on the usual tubular spout as is generally used with such nozzle valves, as previously described. The fluid thus passes through the adapter sleeve 14, around baffle plate 32, between fingers 33, around valve disc 28, through the opening in valve seat 29 into the open space 31 in casing 17, through the spring-loaded valve 50, spout 18 and into the container being filled. Since the fluid must pass through the spring-loaded valve 50 it will be seen that a pressure will be built up in space 31 the degree of which will depend upon the loading of valve 50 by its spring 51. The ratio of load to deflection of spring 51 is such that the pressure in space 31 is maintained substantially constant for any rate of flow of liquid through the device.

The pressure head in space 31 tends to force piston 27 into its cylinder and thus close valve 28 against its seat 29 since the space within cylinder 25 is vented through openings 36 and 46 into the lower end of the venturi and thence to an area of low pressure. However, the cylinder 27 is prevented from moving into cylinder 25 by abutment 35 against the end of which the contact member 38 normally strikes.

The pressure head in space 31 also provides pressure for the operation of the venturi. The fluid, in passing from jet 48 into and through Venturi tube 49, by operation of well known laws of hydrodynamics, tends to evacuate the contents of passages 56, 26, and tube 53 and chamber 19. As long, however, as the screw 58 is not submerged in liquid, air may enter the small orifice 58 and pass through the larger passage 59 in the screw 57, the tube 53 and passage 56 at a rate sufficient to prevent any appreciable lowering of the pressure therein.

If it be assumed that the end of the tubular spout 18 be inserted into the vessel being filled so that, when the liquid therein reaches the desired level, the small orifice 58 will be submerged then, at that time, air is prevented by the liquid from entering orifice 58 and the liquid, by reason of its greater body or viscosity as compared to air, cannot enter the small orifice 58 at a sufficient rate to prevent the jet pump or venturi from lowering the pressure in tube 53 and passages 26 and 56. Since passage 56 connects at its upper end with diaphragm chamber 19, it will be seen that the pressure in this chamber will also be lowered and that the atmospheric pressure acting downward upon the upper surface of diaphragm 21 will force it to bend downward thus forcing plate 23 and rod 24 downward and pushing contact member 38 out of contact with the end of abutment 35 thus allowing the piston 27 to pass into cylinder 25, thus closing valve 28 against its seat 29, and the flow of liquid through the device is cut off. This movement of piston 27 compresses the valve spring 30 which is urging it in the reverse or re-set direction, but the pressure of the liquid against the face of valve 28 will hold it against its seat 29 as long as the manual nozzle valve is held open. As soon as the manual valve is closed the slight leakage of valve 28 allows the pressure above it to fall whereupon spring 30 returns it and piston 27 to their original position, while spring 40 causes the latch member 37 to snap contact member 38 upward into contact with abutment 35, at the same time moving rod 24, plate 23 and diaphragm 21 to their original positions, and the device is then re-set ready for another operation.

It will be noticed that the flow of liquid as it enters the attachment from the nozzle valve is prevented from striking the back side of valve 28 by the baffle plate 32. This construction is used for the purpose of making the device equally operable at either small or large rates of flow. If the momentum of the full stream were allowed to strike the back side of valve 28 this momentum pressure would be added to the static pressure upon piston 27 and the movement of the latch pin 42 would require more effort than it would if the flow was small and the momentum pressure therefore small. The baffle is used to eliminate the effect of the pressure due to the stream's momentum so that the effort required to unlatch the valve is constant regardless of the flow.

It will be noticed that the small orifice 58 in screw 57 is formed in a relatively thin wall section. This is for the purpose of preventing false operation of the device caused by the liquid remaining in these passages. All passages except the small orifice 58 are made large enough to allow liquid to pass through them at a sufficient rate to prevent the jet pump from producing an operative degree of vacuum while orifice 58 is made of such size that air may but liquid may not pass therethrough at sufficient rate to prevent the formation of an operative degree of vacuum. Since the length of orifice 58 is very small any residual liquid remaining in it from a previous operation is removed therefrom into the larger passages so quickly that the jet pump does not have sufficient time to produce an operative degree of vacuum before such obstructing liquid is removed and thus false operation of the device is prevented.

Having thus described my invention in a specific embodiment, I am aware that numerous and extensive changes may be made from the embodiment herein illustrated and described, without departing from the spirit of my invention, and I therefore claim my invention as set forth in the claims accompanying this specification and forming a part thereof.

I claim:

1. In a nozzle, a casing providing a pressure chamber, a spring loaded valve for maintaining pressure in said chamber, a cylinder formed integrally with said casing, a valve controlling the flow of fluid into said chamber, said valve having attached thereto a piston slidably received in said cylinder, said piston being bored out for a major portion of its length, the bottom of said bore being flat, a latch member having a disc shaped head positioned within said bore, a compression spring urging the head of said latching member against the flat bottom of said bore whereby the latch member is yieldably maintained with its longitudinal axis coinciding with the longitudinal axis of said piston, an abutment positioned in the end of said cylinder and so placed as to normally contact the end of the latch member and thus prevent the piston from moving further into the cylinder, a Venturi jet vacuum pump having its inlet opening connected to the pressure chamber, a diaphragm chamber, a diaphragm contained in said chamber, a pusher member whereby a downward movement of the diaphragm operates to move the latch from contact with the abutment and thus let the piston move into the cylinder and cause the valve to shut off the inlet into the pressure chamber, said diaphragm chamber being connected with the vacuum inlet of the Venturi pump, an air leak pipe connected at one end to the diaphragm chamber and terminating at the other end in an orifice of such size that it will admit air but not liquid at such a rate as to prevent the Venturi pump from evacuating the diaphragm chamber sufficiently to cause an operative movement of said diaphragm.

2. In a nozzle a casing providing a passage for liquid, a valve for controlling the flow of liquid through said passage, a piston attached to said valve for operating the valve, a cylinder in which said piston may slide, latch means for latching said valve in its open position comprising an abutment located in said cylinder, a rod member carried by said piston in a flat bottomed longitudinal bore formed therein, said rod having a disc shaped plate carried on its inner end which plate normally lies flat against the flat bottom of said bore, a compression spring urging said plate against said flat bottom whereby said rod member is yieldably maintained in a central position in said bore parallel to the axis thereof, but when said rod is forcibly moved in any direction out of its central position, upon the removal of the deflecting force it will be returned to its normal central position, said rod normally contacting the end of said abutment to prevent the piston from moving the valve to its closed position, and means for moving said rod from contact with said abutment.

3. In a nozzle a casing providing a fluid passage, a cylinder, a fixed abutment in said cylinder, a piston slidable in said cylinder, a valve for controlling the entrance of fluid into said pressure carried by said piston, said piston having a flat bottomed longitudinal bore, a rod member having a plate like head positioned in said bore, a compression spring urging said plate like head against the flat bottom of said bore in such manner that the axis of said rod member normally coincides with the axis of said piston and is in position to contact said abutment so as to prevent said piston from moving into said cylinder, and means for moving said rod member out of contact with said abutment.

4. In a nozzle a casing providing a fluid passage, a cylinder, an abutment in said cylinder, a piston slidable in said cylinder, a valve for controlling the entrance of fluid into said passage carried by said piston, said piston having a longitudinal cavity therein, a rod carried therein, means for yieldably positioning said rod so that its axis normally coincides with the axis of said piston but allowing said rod to be rocked in any direction from said normal position, said rod when in said normal position being in contact with said abutment so as to prevent said piston from moving into said cylinder, and means for moving said rod out of contact with said abutment.

ROBERT T. KILLMAN.